United States Patent [19]

Glance

[11] Patent Number: 5,740,289
[45] Date of Patent: Apr. 14, 1998

[54] OPTICAL ARRANGEMENT FOR AMPLIFYING WDM SIGNALS

[75] Inventor: Bernard Glance, Colts Neck, N.J.

[73] Assignee: AT&T Corp., Middletown, N.J.

[21] Appl. No.: 775,473

[22] Filed: Dec. 30, 1996

[51] Int. Cl.[6] .................... G02B 6/28; H04J 14/00
[52] U.S. Cl. .................... 385/24; 385/15; 385/39; 385/44; 385/42; 359/333; 359/341; 359/113; 359/114; 359/115; 359/124; 359/127
[58] Field of Search ............... 385/14, 15, 16, 385/24, 27, 31, 39, 42, 44, 46, 129, 130, 131, 132; 359/333, 341, 113, 114, 115, 124, 127, 143

[56] References Cited

U.S. PATENT DOCUMENTS

| | | |
|---|---|---|
| 4,886,334 | 12/1989 | Aoki .................... 385/24 X |
| 5,035,481 | 7/1991 | Mollenauer .................... 385/24 X |
| 5,204,923 | 4/1993 | Grasso et al. .................... 385/24 |
| 5,280,549 | 1/1994 | Barnard et al. .................... 385/15 |
| 5,339,157 | 8/1994 | Glance et al. .................... 385/24 |
| 5,414,548 | 5/1995 | Tachikawa et al. .................... 359/130 |
| 5,434,937 | 7/1995 | Glance .................... 385/24 |
| 5,461,685 | 10/1995 | Glance et al. .................... 385/24 |
| 5,488,680 | 1/1996 | Dragone .................... 385/24 |
| 5,504,827 | 4/1996 | Schimpe .................... 385/24 |
| 5,524,014 | 6/1996 | Kaminow et al. .................... 372/28 |
| 5,657,406 | 8/1997 | Ball .................... 385/24 |

Primary Examiner—Brian Healy

[57] ABSTRACT

An amplification circuit for amplifying wavelength-division-multiplexed (WDM) optical signals in a fiber-optic network is presented. The amplification circuit amplifies WDM signals propagating simultaneously in both directions through a fiber-optic link with a single unidirectional optical amplifier.

24 Claims, 2 Drawing Sheets

OPTICAL ARRANGEMENT FOR AMPLIFYING WDM SIGNALS

BACKGROUND OF THE INVENTION

This invention relates to fiber-optic telecommunication networks. More particularly, this invention relates to amplification of wavelength-division-multiplexed (WDM) optical signals propagating through such networks.

Wavelength-division-multiplexing increases the capacity of existing fiber-optic networks by enabling multiple signals of different wavelengths to propagate simultaneously through individual fiber-optic lines, known as links. Each link supports bidirectional signal transport, that is, multiple signals propagating simultaneously both upstream and downstream through a link. Approximately 10 gigabits of data per sec per wavelength can be propagated (a "bit" is a binary digit, the basic unit of computer data, and a "gigabit" is a billion bits). Typically, tens of signals, each having a different wavelength, can propagate simultaneously through a single fiber-optic link.

One problem in large fiber-optic networks is attenuation (or gradual loss) of fiber-optic signals as they propagate from their source. Such attenuated fiber-optic signals must be repowered, or amplified, before the information carried by those signals is lost. Signal amplification is accomplished by installing optical amplifiers at particular locations throughout the network. Generally, optical amplifiers are needed every 50 kilometers from a signal source.

The typical optical amplifier is limited, however, to amplifying signals propagating in only one direction relative to its input/output orientation. Thus, to amplify signals propagating bidirectionally through a link, a pair of amplifiers would generally be required at every location requiring signal amplification, one for amplifying signals propagating in one direction and the other for amplifying signals propagating in the opposite direction. Moreover, optical amplifiers will not pass signals propagating in the direction opposite their input/output orientation, thus negating the placement of two amplifiers back-to-back on the same link.

Known fiber-optic networks undesirably run parallel fiber-optic links. Each link is limited to unidirectional signal propagation to permit signal amplification through an optical amplifier on that link. Such networks undesirably increase excess link capacity by having two links where one would likely be sufficient to handle the volume of signal flow propagating in each direction.

A portion of such a conventional prior art network is shown in FIG. 1. A group or "comb" of WDM signals 101 is shown propagating left to right (with white arrowheads) through fiber-optic link 103 to optical amplifier 105, while a second comb of WDM signals 107 is shown propagating in the opposite direction (right to left with black arrowheads) through fiber-optic link 109 to second optical amplifier 111. In addition to undesirably increasing excess link capacity (because either link 103 or 109 alone would be capable of propagating both combs of signals 101 and 107), this network incurs additional costs associated with the installation and maintenance of parallel links and amplifiers.

Fiber-optic networks have been proposed that avoid the installation of parallel links by advantageously employing frequency routers. Frequency routers can separate and combine upstream and downstream WDM signals by multiplexing and demultiplexing signals based on signal wavelength. Note that when referring to the operation of frequency routers, the terms "wavelength" and "frequency" are interchangeable. In the proposed networks, a first frequency router routes signals propagating in one direction to, for example, a branch link, while routing signals of the opposite direction to the mainline link. The branch link contains a second amplifier for amplifying those signals routed to it by the first frequency router, while the signals on the mainline link are amplified by an amplifier located there. A second frequency router then returns the amplified signals from the branch link to the mainline link.

A portion of such a proposed network is shown in FIG. 2. Two combs of oppositely propagating WDM signals 201 are propagating through mainline fiber-optic link 203. At frequency router 205, signals 207, which are propagating right to left and are shown in FIG. 2 with black arrowheads, are routed to branch link 209 where they are amplified by optical amplifier 211. Amplified signals 208 are then routed by frequency router 213 to link 203 where they propagate as one of two combs of WDM signals 215. Signals 217, which are propagating left to right and are shown in FIG. 2 with white arrowheads, are routed by frequency router 213 to optical amplifier 219 for amplification. Amplified signals 218 are then routed by frequency router 205 to link 203 where they propagate as one of two combs of WDM signals 201. While this arrangement eliminates the second parallel fiber-optic link shown in FIG. 1, advantageously avoiding the undesirable increase in excess link capacity and associated costs of installing and maintaining parallel links, this arrangement still undesirably requires two amplifiers at every location requiring signal amplification.

Optical amplifiers are very expensive network components. A network spanning long distances, such as, for example, a long distance telephone network, incurs significant costs by providing two amplifiers at each location requiring signal amplification. A reduction therefore in the number of amplifiers required to properly amplify bidirectionally propagating WDM signals would result in significant cost savings.

Therefore, it would be desirable to provide an amplification circuit with a single optical amplifier for amplifying bidirectionally propagating WDM fiber-optic signals.

It would also be desirable to provide fiber-optic networks with a plurality of such amplification circuits to significantly reduce the number of optical amplifiers in the network, while still providing proper amplification of fiber-optic signals.

It would further be desirable to provide fiber-optic networks with significantly reduced numbers of optical amplifiers without undesirably increasing excess link capacity.

SUMMARY OF THE INVENTION

In accordance with this invention, there is provided an amplification circuit for use in a wavelength-division-multiplexed (WDM) fiber-optic network that can amplify signals propagating simultaneously in both directions, upstream and downstream, through a single fiber-optic link. The amplification circuit employs a single optical amplifier and at least one frequency router. Combs of WDM signals propagating in one direction are multiplexed with combs of WDM signals propagating in the opposite direction, amplified through a single optical amplifier, and then demultiplexed and routed in their original propagation directions. Fiber-optic networks using the amplification circuit are also provided.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

The present invention requires only a single optical amplifier to amplify wavelength-division-multiplexed (WDM) signals propagating simultaneously both upstream and downstream through a fiber-optic link. WDM enables multiple signals, each having a unique wavelength, to propagate simultaneously and bidirectionally through a single link. Use of the invention in a WDM fiber-optic network eliminates by as much as half the number of optical amplifiers required to amplify WDM fiber-optic signals, while still providing proper amplification of those signals throughout the network without increasing excess link capacity.

A fiber-optic network typically includes a plurality of nodes for adding signals to, dropping signals from, and routing signals through the network; a plurality of fiber-optic links for propagating signals between nodes; and a plurality of optical amplifiers to combat signal losses incurred during signal propagation from signal sources.

Figure 3:
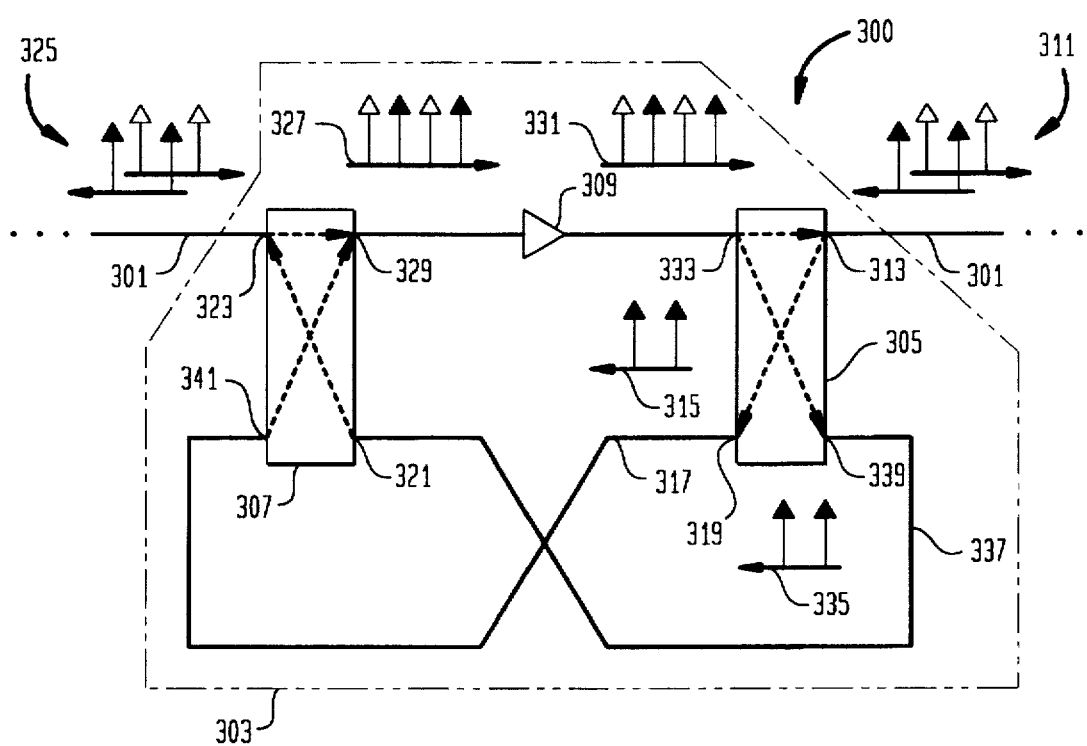
FIG. 3 is a block diagram of a portion of a preferred embodiment of a fiber-optic network according to the present invention.

FIG. 3 illustrates a portion of fiber-optic network 300 according to the present invention. The portion shown includes mainline fiber-optic link 301, which is representative of any link in the network exceeding approximately 50 kilometers in length, and amplification circuit 303. Amplification circuit 303 includes frequency routers 305 and 307 and optical amplifier 309.

Frequency routers 305 and 307 provide optical switching, multiplexing, and demultiplexing functions based on the wavelengths of the individual signals. Note that when referring to the operation of frequency routers, the terms "wavelength" and "frequency" are interchangeable, wavelength $\lambda$ and frequency f being related by the equation $\lambda=v/f$, where v is wave velocity, usually considered a constant. A signal thus having a unique wavelength will also have a unique frequency. Optical switching routes signals through particular paths in the frequency router to particular output ports of the frequency router. Multiplexing combines signals into a group or "comb" of signals, and demultiplexing separates one or more individual signals from a comb of signals. Frequency routers can be, for example, of the type disclosed in U.S. Pat. Nos. 5,136,671 and 5,002,350, or they can be of the Mach-Zehnder or interferometer type, which are also known in the art.

Optical signal loss, or optical signal attenuation, in the network of FIG. 3 is typically 0.3 dB per kilometer. Preferably, signal amplification should occur approximately every 50 kilometers with a signal gain of approximately 30 dB. The particular gain and proximity of amplifiers can of course be varied according to the particular needs and characteristics of the network (e.g., inherent losses, locations of signal sources, etc.). Failure to properly amplify attenuated signals can result in a loss of the information carried by those signals.

Optical amplifiers are known in the art and generally include a rare earth (e.g., erbium) doped optical fiber, a pumped light source for exciting the rare earth ions, and an optical coupler for coupling the pumped light to the doped optical fiber. Amplification occurs as the propagating signals flow through the doped fibers and are exposed to the stimulated emissions caused by the excited ions.

Referring to FIG. 3, optical amplifier 309 amplifies optical signals propagating left to right. Signals propagating in the opposite direction (right to left) will not be amplified by, nor will they pass through, amplifier 309. Optical amplifier 309 can thus be considered a unidirectional device.

Operation of amplification circuit 303 is as follows: two groups of interlaced oppositely propagating combs of WDM signals 311 are propagating on fiber-optic link 301 at port 313 of frequency router 305. Signals 315, propagating right to left and shown in FIG. 3 with black arrowheads, are routed through frequency router 305 to fiber-optic link 317 at port 319. Signals 315 propagate through link 317 to port 341 of frequency router 307. Frequency router 307 then multiplexes (combines) signals 315 with signals propagating left to right, shown with white arrowheads, received at port 323 from another two groups of interlaced oppositely propagating combs of WDM signals 325.

The multiplexed interlaced combs of WDM signals 327 exit frequency router 307 at port 329 and propagate to optical amplifier 309, where they are amplified. Interlaced combs of amplified WDM signals 331 then propagate to port 333 of frequency router 305, where they are demultiplexed (separated).

The amplified signals originally propagating left to right are routed through frequency router 305 to link 301 at port 313, where they become one of two combs of interlaced oppositely propagating WDM signals 311.

Amplified signals 335 are routed through frequency router 305 to fiber-optic link 337 at port 339, where they propagate to port 321 of frequency router 307. At frequency router 307, amplified signals 335 are routed to link 301 at port 323, where they return to their original right to left direction of propagation and become one of two combs of oppositely propagating WDM signals 325.

Figure 1:
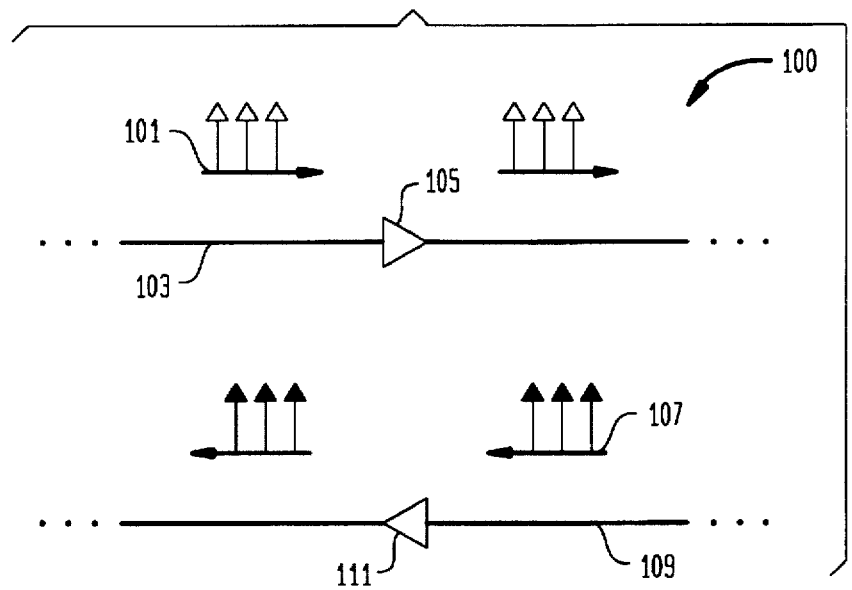
FIG. 1 is a block diagram of a portion of a prior art fiber-optic network.
Figure 2:
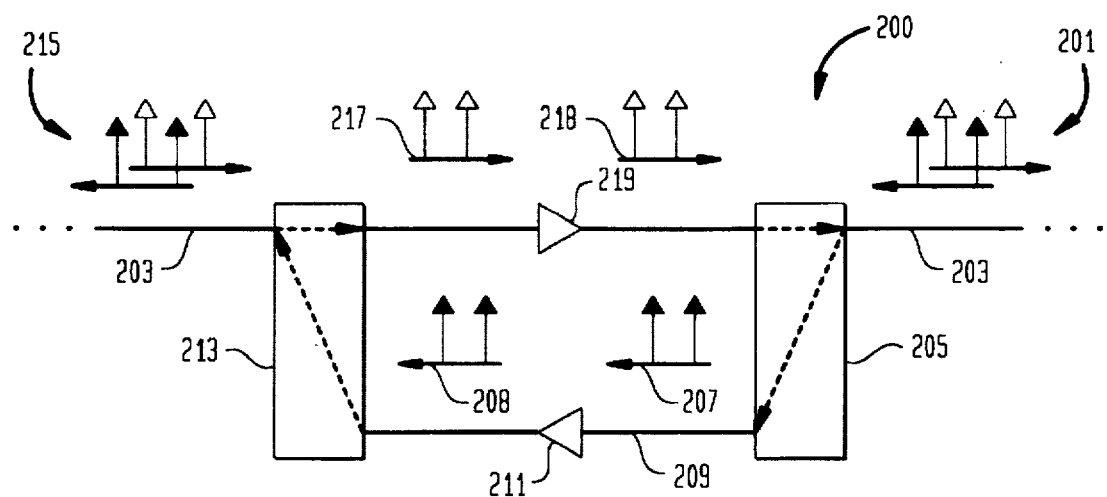
FIG. 2 is a block diagram of a portion of a second prior art fiber-optic network.

Thus it has been shown that WDM signals propagating in opposite directions through fiber-optic links can be amplified by an amplification circuit with a single optical amplifier. Such amplification circuits can be used in fiber-optic networks at each location requiring bidirectional signal amplification. Use of such circuits reduces by as much as half the number of optical amplifiers required to properly amplify propagating signals as compared to the previously discussed networks shown in FIGS. 1 and 2. Moreover, use of such circuits does not undesirably increase a network's excess link capacity.

One skilled in the art will appreciate that the present invention can be practiced by other than the described embodiments, which are presented for purposes of illustration and not of limitation, and the present invention is limited only by the claims which follow.

What is claimed is:

1. An amplification circuit for amplifying a plurality of wavelength-division-multiplexed signals in a fiber-optic network, said network including a plurality of links for simultaneously bidirectionally propagating said plurality of signals, said circuit comprising:

an optical amplifier; and frequency router circuitry coupled to a first portion of said network, to said amplifier, and to a second portion of said network; whereby:

said frequency router circuitry receives from said first portion of said network a first subplurality of said signals and receives from said second portion of said network a second subplurality of said signals, multiplexes said first and second subpluralities of said signals, and routes said multiplexed first and second subpluralities of said signals to said amplifier;

said amplifier amplifies said multiplexed first and second subpluralities of said signals; and said frequency router circuitry receives from said amplifier said amplified first and second subpluralities of said signals, demultiplexes said amplified first and second subpluralities of said signals, routes said amplified first subplurality of said signals to said second portion of said network, and routes said amplified second subplurality of said signals to said first portion of said network.

2. An amplification circuit for amplifying a plurality of wavelength-division-multiplexed signals in a fiber-optic network, said network including a plurality of links for simultaneously bidirectionally propagating said plurality of signals, said circuit comprising:

an optical amplifier; and first and second frequency routers; wherein:

said first frequency router is coupled to said amplifier, to said second frequency router, and to a first portion of said network;

said amplifier is coupled to said second frequency router; and said second frequency router is coupled to a second portion of said network; whereby:

said first frequency router receives from said first portion of said network a first subplurality of said signals and routes said first subplurality of said signals to said second frequency router;

said second frequency router multiplexes said first subplurality of said signals with a second subplurality of said signals received from said second portion of said network and routes said multiplexed first and second subpluralities of said signals to said amplifier;

said amplifier amplifies said multiplexed first and second subpluralities of said signals;

said first frequency router receives from said amplifier said amplified multiplexed first and second subpluralities of said signals, demultiplexes said amplified multiplexed first and second subpluralities of said signals, routes said amplified first subplurality of said signals to said second frequency router, and routes said amplified second subplurality of said signals to said first portion of said network; and said second frequency router routes said amplified first subplurality of said signals to said second portion of said network.

3. The amplification circuit of claim 2 wherein said first frequency router comprises:

a first port coupled to said first portion of said network for routing to said first portion of said network said amplified second subplurality of said signals and for receiving from said first portion of said network said first subplurality of said signals;

a second port coupled to said second frequency router for routing to said second frequency router said first subplurality of said signals received from said first port;

a third port coupled to said second frequency router for routing to said second frequency router said amplified first subplurality of said signals; and a fourth port coupled to said amplifier for receiving from said amplifier said amplified multiplexed first and second subpluralities of said signals, for routing to said first port said amplified second subplurality of said signals, and for routing to said third port said amplified first subplurality of said signals.

4. The amplification circuit of claim 3 wherein said first subplurality of said signals has a first plurality of respective unique wavelengths, said amplified first subplurality of said signals has said first plurality of respective unique wavelengths, and said amplified second subplurality of said signals has a second plurality of respective unique wavelengths.

5. The amplification circuit of claim 2 wherein said second frequency router comprises:

a first port coupled to said second portion of said network for receiving from said second portion of said network said second subplurality of said signals and for routing to said second portion of said network said amplified first subplurality of said signals;

a second port coupled to said first frequency router for receiving from said first frequency router said amplified first subplurality of said signals and for routing to said first port said amplified first subplurality of said signals;

a third port coupled to said first frequency router for receiving from said first frequency router said first subplurality of said signals; and a fourth port coupled to said amplifier for routing to said amplifier said multiplexed first and second subpluralities of said signals.

6. The amplification circuit of claim 5 wherein said first subplurality of said signals has a first plurality of respective unique wavelengths, said amplified first subplurality of said signals has said first plurality of respective unique wavelengths, and said second subplurality of said signals has a second plurality of respective unique wavelengths.

7. The amplification circuit of claim 2 wherein said coupling between said first and second frequency routers includes two separate links.

8. The amplification circuit of claim 2 wherein said couplings are fiber-optic links.

9. A fiber-optic network comprising:

a plurality of nodes for inputting, outputting, and routing a plurality of wavelength-division-multiplexed signals;

a plurality of links for simultaneously bidirectionally propagating said plurality of signals; and a plurality of amplification circuits for amplifying said plurality of signals, each said amplification circuit comprising:

an optical amplifier; and first and second frequency routers; wherein:

said first frequency router is coupled to said amplifier, to said second frequency router, and to a first portion of said network;

said amplifier is coupled to said second frequency router; and said second frequency router is coupled to a second portion of said network; whereby:

said first frequency router receives from said first portion of said network a first subplurality of said signals and routes said first subplurality of said signals to said second frequency router;

said second frequency router multiplexes said first subplurality of said signals with a second subplurality of said signals received from said second portion of said network and routes said multiplexed first and second subpluralities of said signals to said amplifier;

said amplifier amplifies said multiplexed first and second subpluralities of said signals;

said first frequency router receives from said amplifier said amplified multiplexed first and second subpluralities of said signals, demultiplexes said amplified multiplexed first and second subpluralities of said signals, routes said amplified first subplurality of said signals to said second frequency router, and routes said amplified second subplurality of said signals to said first portion of said network; and said second frequency router routes said amplified first subplurality of said signals to said second portion of said network.

10. The network of claim 9 wherein said first subplurality of said signals has a first plurality of respective unique wavelengths, said amplified first subplurality of said signals has said first plurality of respective unique wavelengths, said second subplurality of said signals has a second plurality of respective unique wavelengths, and said amplified second subplurality of said signals has said second plurality of respective unique wavelengths.

11. The network of claim 9 wherein each said first frequency router comprises:

a first port coupled to said first portion of said network for routing to said first portion of said network said amplified second subplurality of said signals and for receiving from said first portion of said network said first subplurality of said signals;

a second port coupled to said second frequency router for routing to said second frequency router said first subplurality of said signals received from said first port;

a third port coupled to said second frequency router for routing to said second frequency router said amplified first subplurality of said signals; and a fourth port coupled to said amplifier for receiving from said amplifier said amplified multiplexed first and second subpluralities of said signals, for routing to said first port said amplified second subplurality of said signals, and for routing to said third port said amplified first subplurality of said signals.

12. The network of claim 9 wherein each said second frequency router comprises:

a first port coupled to said second portion of said network for receiving from said second portion of said network said second subplurality of said signals and for routing to said second portion of said network said amplified first subplurality of said signals;

a second port coupled to said first frequency router for receiving from said first frequency router said amplified first subplurality of said signals and for routing to said first port said amplified first subplurality of said signals;

a third port coupled to said first frequency router for receiving from said first frequency router said first subplurality of said signals; and a fourth port coupled to said amplifier for routing to said amplifier said multiplexed first and second subpluralities of said signals.

13. The network of claim 9 wherein said coupling between said first and second frequency routers includes two separate links.

14. The network of claim 9 wherein said couplings are fiber-optic links.

15. A method of amplifying a plurality of wavelength-division-multiplexed signals between first and second fiber-optic links, each said link providing simultaneous bidirectional signal propagation, said method comprising the steps of:

multiplexing a first subplurality of said signals having a first plurality of respective unique wavelengths received from said first link with a second subplurality of said signals having a second plurality of respective unique wavelengths received from said second link;

amplifying said multiplexed first and second subpluralities of said signals;

routing said first subplurality of said signals to said second link; and routing said second subplurality of said signals to said first link.

16. The method of claim 15 further comprising the step of:

propagating said first subplurality of said signals in a single direction.

17. The method of claim 15 further comprising the step of:

propagating said second subplurality of said signals in a single direction.

18. The method of claim 15 wherein said step of multiplexing further comprises the step of propagating said multiplexed first and second subpluralities of said signals in a single direction.

19. A method of amplifying a plurality of wavelength-division-multiplexed signals between first and second fiber-optic links with frequency router circuitry and an optical amplifier, each said link providing simultaneous bidirectional signal propagation, said frequency router circuitry providing signal multiplexing, demultiplexing, and routing functions, and said optical amplifier providing optical signal amplification, said method comprising the steps of:

multiplexing a first subplurality of said signals having a first plurality of respective unique wavelengths received from said first link with a second subplurality of said signals having a second plurality of respective unique wavelengths received from said second link;

amplifying said multiplexed first and second subpluralities of said signals;

demultiplexing said multiplexed first and second subpluralities of said signals into their constituent respective first and second subpluralities of said signals;

routing said first subplurality of said signals to said second link; and routing said second subplurality of said signals to said first link.

20. The method of claim 19 wherein said step of multiplexing further comprises the step of propagating said multiplexed first and second subpluralities of said signals in a single direction.

21. The method of claim 19 wherein said step of multiplexing is accomplished with a first frequency router circuit.

22. The method of claim 21 wherein said step of multiplexing with said first frequency router circuit comprises the steps of:

receiving said first subplurality of said signals at a first port of said first frequency router;

receiving said second subplurality of said signals at a second port of said first frequency router;

multiplexing said first and second subpluralities of said signals; and routing said multiplexed first and second subpluralities of said signals to a third port of said first frequency router.

23. The method of claim 19 wherein said step of demultiplexing is accomplished with a second frequency router circuit.

24. The method of claim 23 wherein said step of demultiplexing with said second frequency router circuit comprises the steps of:

receiving said multiplexed first and second subpluralities of said signals at a first port of said second frequency router;

demultiplexing said multiplexed first and second subpluralities of said signals;

routing said first subplurality of said signals to a second port of said second frequency router; and routing said second subplurality of said signals to a third port of said second frequency router.

* * * * *